Oct. 27, 1964
T. B. GRIFFITH
3,154,347
BALANCING WEIGHTS FOR WHEELS
Filed Oct. 8, 1962
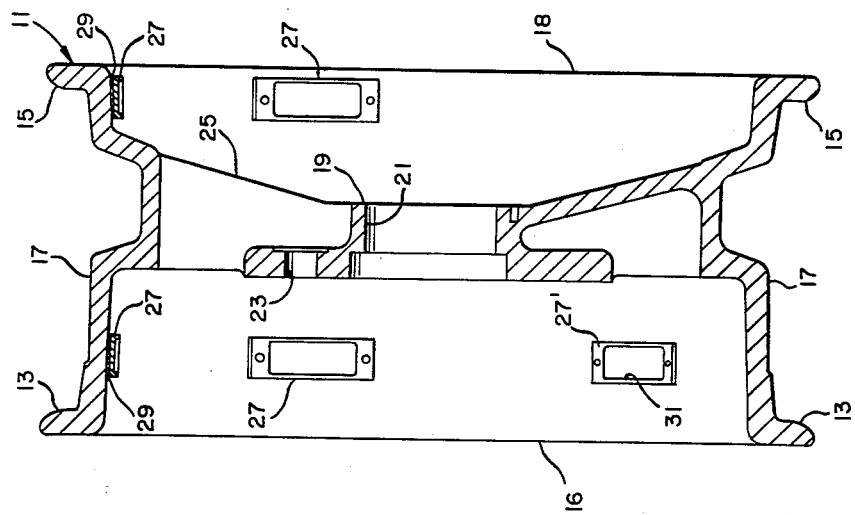
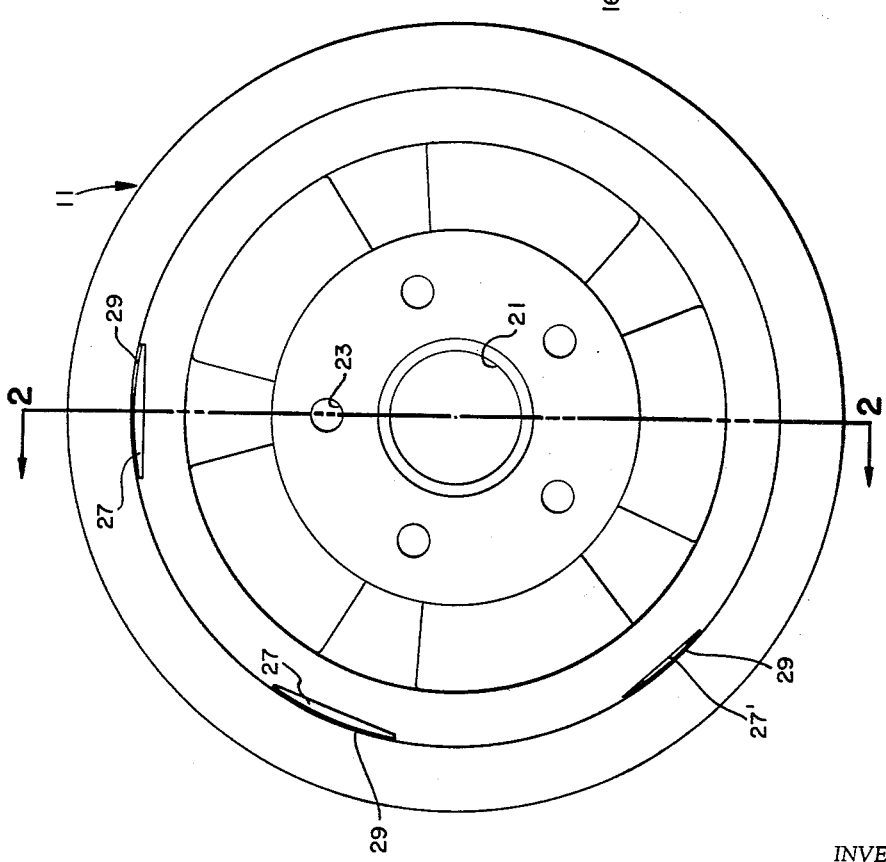
INVENTOR.
THOMAS B. GRIFFITH
BY
*Flehr and Swain*
ATTORNEYS

United States Patent Office 3,154,347
Patented Oct. 27, 1964

3,154,347
BALANCING WEIGHTS FOR WHEELS
Thomas B. Griffith, 1065 Buckland Ave., San Carlos, Calif., assignor of fifty-two percent to James O. Ellison, Piedmont, and twenty-four percent to Ellen Younglove, San Francisco, Calif.
Filed Oct. 8, 1962, Ser. No. 228,918
1 Claim. (Cl. 301—5)

This invention relates to balancing weights and more particularly to balancing weights for vehicle wheels.

It has long been recognized that vehicle wheels carrying tires, when operated at high speeds, should be balanced such that they rotate about the center of mass of the wheel and tire. With the usual pressed steel wheels this balancing is accomplished by the application of lead weights to the rim thereof with hammered clips. In non-ferrous wheels, such as magnesium and aluminum, however, the application of balancing weights in the aforesaid manner is difficult due to the usual scarring effect caused by the hammering operation and also due to the shape of the wheel flange.

Consequently, non-ferrous wheels have in the past been balanced by other methods, the most used of which has been by drilling and tapping the wheel itself at several locations and by applying weights and threaded studs or screws to the tapped holes. While this method of balancing is partially satisfactory in its result, it is clearly time consuming and expensive and further does not lend itself to changing the balance such as often required when changing tires. Also drilling and tapping tends to weaken the wheel.

In view of the above it is a general object of this invention to provide an improved method and apparatus for balancing wheels.

It is a more particular object of the present invention to provide a balancing method for wheels which is particularly adaptable to wheels to the non-ferrous type.

It is still another object of the invention to provide a method and apparatus of the aforementioned character for balancing wheels such that possible scarring of the wheels by the balancing operator is minimized.

These and other objects and features of the invention will become more clearly apparent upon a review of the following description in conjunction with the accompanying drawing, in which:

FIGURE 1 is an elevational view of a wheel having balancing weights in accordance with the invention; and FIGURE 2 is a sectional view taken along the line 2—2 of FIGURE 1.

Referring to the figures, a non-ferrous wheel, such as a magnesium wheel 11, is shown, having bead seats 13 and 15 joined together by a generally annular web 17. A circular web 19 spans the annulus formed by the web 17. The circular web 19 may include an opening 21 for receiving an automobile axle. In addition, there may be included a series of stud or bolt openings 23 arranged in a circle concentric with the opening 21. Further the web 19 may include openings 25 in order to provide overall weight reduction.

In accordance with the invention balancing weights 27 may be secured to the inner side of the annular web 17. It is noted that balancing weights 27 may be secured on either the inboard 16 or outboard 18 side of the wheel, such that they may be exposed or unexposed on a mounted wheel. Balancing weights 27 are secured to the wheel by means of a tape 29 having an adhesive on both sides thereof. A suitable tape for the purpose is Minnesota Mining & Manufacturing Co., St. Paul, Minnesota, No. Y9002.

This particular tape although it has a relatively strong adhesive has a sufficiently low adhesion that if desired, the weights 27 may be pried loose from the wheel by means of a screwdriver or the like. Stronger adhesive than this is not necessary since the adhesive is merely employed to maintain the weights in position while the wheel is standing still and during starting and stopping. Upon rotation of the wheel centrifugal force urges the weight closer into contact with the wheel.

Thus in order to apply balancing weights to the wheel in accordance with the present invention, tape having adhesive on both sides, that is a double adhesive tape, is merely applied to the weight first, then to that portion of the wheel which is considered light.

As can be seen in FIGURE 1, one surface of the balancing weight forms the arc of a circle of a radius similar to the radius of the wheel to be balanced. The opposite surface of the weight is substantially a chord of the same circle. The edges of the balancing weight may be generally parallel as shown in FIGURE 2.

In the application of rather small weights such as the weight shown at 27', it is noted that the arcuate surface and the chord surface are relatively similar since the arc is such a slight portion of the overall circle. In such instances particularly, it is desirable to indent the chord portion of the weight as at 31. Thus an attendant attempting to apply weights to the wheel may not inadvertently apply the chord section rather than the arc section against the wheel.

I claim:

In combination, a wheel having a substantially cylindrical rim portion: a balancing weight having a surface fitted to the inner face of said rim portion, substantially complementary to said inner face of said rim portion; whereby said surface defines a portion of a cylinder, the face of said balancing weight opposite said surface defining a chord to said portion of a cylinder, whereby said weight tapers from the mid-portion thereof toward each end; and a pressure sensitive adhesive means between said surface and said inner face, adhering to both, and serving to releasably hold said weight on said wheel.

References Cited in the file of this patent
UNITED STATES PATENTS

| | | |
|---|---|---|
| 2,336,920 | Beaman | Dec. 14, 1943 |
| 2,585,802 | Loewe | Feb. 12, 1952 |
| 2,640,727 | Kennedy | June 2, 1953 |
| 2,822,290 | Webber | Feb. 4, 1958 |
| 2,998,282 | Moyer | Aug. 29, 1961 |

FOREIGN PATENTS

| | | |
|---|---|---|
| 1,109,941 | France | Oct. 5, 1955 |